United States Patent [19]
Watanabe

[11] Patent Number: 5,625,255
[45] Date of Patent: Apr. 29, 1997

[54] INORGANIC THIN FILM ELECTROLUMINESCENCE DEVICE

[75] Inventor: Masao Watanabe, Minami-ashigara, Japan

[73] Assignee: Fuji Xerox Co., Ltd., Tokyo, Japan

[21] Appl. No.: 136,770

[22] Filed: Oct. 15, 1993

[30] Foreign Application Priority Data

Dec. 25, 1992 [JP] Japan ................................ 4-358048
Dec. 25, 1992 [JP] Japan ................................ 4-358049

[51] Int. Cl.$^6$ ............................................. H01J 1/62
[52] U.S. Cl. ............................................. 313/506; 313/503
[58] Field of Search .............................. 313/502, 503, 313/506; 252/301.44; 428/917, 696, 697

[56] References Cited

U.S. PATENT DOCUMENTS

| | | | |
|---|---|---|---|
| 4,512,911 | 4/1985 | Kotera | 252/301.4 |
| 4,751,427 | 6/1988 | Barrow | 313/503 |
| 5,198,721 | 3/1993 | Kahng | 313/503 |
| 5,286,517 | 2/1994 | Kahng | 427/66 |
| 5,384,517 | 1/1995 | Uno | 315/169.3 |
| 5,543,237 | 8/1996 | Watanabe | 313/503 |
| 5,552,667 | 9/1996 | Cho et al. | 313/498 |

*Primary Examiner*—Sandra L. O'Shea
*Assistant Examiner*—Vip Patel
*Attorney, Agent, or Firm*—Oliff & Berridge

[57] ABSTRACT

An inorganic thin film EL device comprises a substrate, a pair of electrode layers and a pair of insulating layers formed on the substrate in this order, and a light emission layer sandwiched between the paired insulating layers and arranged such that light emitted from the light emission layer is taken out from one side the light emission layer. The light emission layer is made of a composition which consists essentially of a fluoride of a metal of the group II of the Periodic Table and a member selected from the group consisting of rare earth elements and compounds thereof. The metal fluoride is of the formula, $M_{1-x}F_{2+y}$ or $M_{1+x}F_{2-y}$, wherein M represents a metal of the group II of the Periodic Table, x is a value ranging from 0.001 to 0.9 and y is a value ranging from 0.001 to 1.8. The device is useful as a flat light source.

16 Claims, 1 Drawing Sheet

INORGANIC THIN FILM ELECTROLUMINESCENCE DEVICE

BACKGROUND OF THE INVENTION

1. Field Of The Invention

This invention relates to the art of the electroluminescence and more particularly, to an inorganic thin film electroluminescence device (hereinafter referred to simply as EL device) using inorganic fluorescent materials, which device is particularly suitable for used as a flat light source or a flat panel display.

2. Description Of The Prior Art

Inorganic thin film EL devices have recently drawn attention to their use as a flat panel display or flat light source. For this purpose, there has been heretofore used inorganic fluorescent materials, which comprise a matrix made of at least one of ZnS, CaS, SrS and the like and doped with not larger than 5 wt % of at least one element selected from Mn, Tb, Sn, Ce, Eu, Sm, Tm and the like as a light emission center.

Among these fluorescent materials, ZnS:Mn has been studied for use as an orange color fluorescent material. Because of its good luminance, life and the like characteristics, this fluorescent material has been utilized as a flat panel display. On the other hand, lead sulfides such as ZnS:Tb have been widely studied for use as a green color fluorescent material.

Other matrices which have been extensively studied include alkaline earth metal sulfide fluorescent material such as SrS:Ce as a blue light emitting fluorescent material, CaS:Eu as a red light emitting fluorescent material, a green light emitting fluorescent material, and the like.

The light emitting mechanisms of the fluorescent material or fluorescer of transition metals and rare earth elements are different from each other: with transition metals such as Mn, the light emission is caused by direct collision of the electrons of the matrix, whereas with rare earth elements, light emission depends greatly on the transition of an energy corresponding to the band gap of the matrix. The alkaline earth metal sulfides have a band gap energy ranging from 4.3 to 4.4 eV and ZnS has a band gap energy as small as 3.6 eV. In order to obtain blue to UV light emission which requires a high energy, these band gap energies are too small. Accordingly, for the blue to UV light emission, studies have been made on matrices which have a high band gap energy and include, for example, $ZnF_2$:Gd whose band gap energy ranges 7 to 8 eV (J. J. A. P. vol. 10 B (1991), pp. L1815 to 11816) and $CaF_2$:Eu (Appl. Phys. Lett. 41, 1982, p.462).

Inorganic fluorescers using these sulfides except ZnS:Mn are not always satisfactory for use as a flat panel display or flat light source with respect to the luminance, efficiency and life, and have never been applied as a flat panel color display at present.

SUMMARY OF THE INVENTION

It is therefore an object of the present invention to provide an inorganic thin film EL device which overcomes the problems of the prior art and which is capable of full color display at a practical level.

It is another object of the invention to provide an inorganic thin film EL device which comprises a light emission layer made of an inorganic fluorescer of a specific type whereby there can be emitted light which has a higher luminance, a longer life and a wider range wavelength than light from known counterparts.

We have found that when fluorides of metals of the group IIb of the Periodic Table to which rare earth elements are added are used as a light emission layer of EL devices, light whose wavelength covers UV to IR spectrum ranges can be emitted.

Broadly, the invention is characterized in that a light emission layer of an inorganic thin film EL device is made of a composition which comprises a fluoride of a metal of the group II of the Periodic Table and a rare earth element or its compound and that the metal fluoride has such a composition that either the fluorine atom or the metal is compositionally deviated from the theoretical from the standpoint of the stoichiometry. More particularly, the content of the fluorine atom or the metal is larger than the theoretical.

In accordance with one embodiment of the invention, there is provided an inorganic thin film EL device which comprises a substrate, a pair of electrode layers and a pair of insulating layers formed on the substrate in this order, and a light emission layer sandwiched between the paired insulating layers and arranged such that light emitted from the light emission layer is taken out from one side the light emission layer, the light emission layer being made of a composition which consists essentially of a fluoride of a metal of the group II of the Periodic Table and a member selected from the group consisting of rare earth elements and compounds thereof, the metal fluoride being of the formula, $M_{1-x}F_{2+y}$, wherein M represents a metal of the group II of the Periodic Table, x is a value ranging from 0.001 to 0.9 and y is a value ranging from 0.001 to 1.8.

According to another embodiment of the invention, there is also provided an inorganic thin film EL device which has a similar construction as set out above but wherein the light emission layer is made of a composition which consists essentially of a fluoride of a metal of the group II of the Periodic Table and a member selected from the group consisting of rare earth elements and compounds thereof, the metal fluoride being of the formula, $M_{1+x}F_{2-y}$, wherein M represents a metal of the group II of the Periodic Table, x is a value ranging from 0.001 to 0.9 and y is a value ranging from 0.001 to 1.8.

PREFERRED EMBODIMENT OF THE INVENTION

Figure 1:
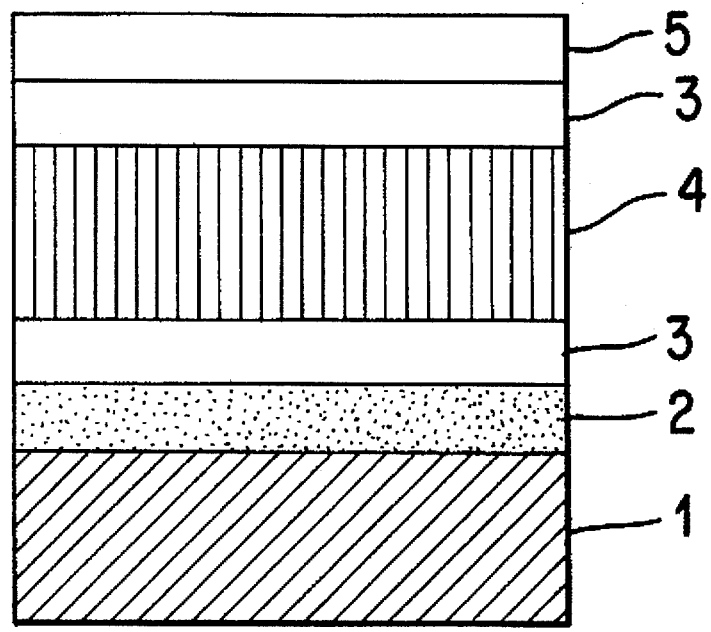
FIG. 1 is a schematic sectional view of an inorganic thin film EL device according to one embodiment of the invention.

As set out above, the invention is characterized by the use of a specific type of inorganic composition as the light emission layer. These inorganic composition is first described.

The light emission layer is made of a composition which should comprise a major proportion of a fluoride of a metal of the group II and a minor proportion of a rare earth element or its compound. The metal fluoride can be represented by the formula, $M_{1-x}F_{2+y}$ or $M_{1+x}F_{2-y}$, wherein M, x and y have, respectively, the same meanings as defined above. In the former formula, the content of the fluorine atom becomes larger than that required in the stoichiometric composition of MF. As a result, it becomes possible to increase the concentration of hole carriers in the light emission layer. Accordingly, an injection layer of electrons can be provided.

In contrast, in the latter formula, the content of the metal becomes larger than that required in the stoichiometric composition of MF. Thus, it becomes possible to increase the concentration of electron carriers in the light emission layer, enabling one to form an injection layer of the holes.

In both formulae, x and y should preferably be in the ranges of from 0.2 to 0.6 and 0.4 to 1.2, respectively.

The metals of the group II include, for example, cadmium, zinc, strontium, calcium, barium and beryllium. At least one fluoride of the metal is used in the practice of the invention.

The rare earth element which is added to the group II metal fluoride includes, for example, cerium, praseodymium, neodymium, samarium, europium, gadolinium, terbium, dysprosium, holmium, erbium, thulium and ytterbium. At least one member selected from these elements and compounds thereof is added to the metal fluoride. The compounds of the rare earth elements include those compounds which contain at least one of fluorine, chlorine, bromine, iodine and oxygen. Specific and preferred examples of these compounds include gadolinium fluoride, erbium fluoride, neodymium oxide and the like. These elements and/or compounds thereof are added to the metal fluoride in an amount of about 10 wt %, when calculated as the element, based on the total of the element and/or compound and the metal fluoride.

In order to form the light emission layer, the starting materials are press molded into a pellet, if necessary, along with a co-activator. Examples of such co-activators include low melting metals such as Au, Zn and the like. The pellet is then subjected to a vapor phase process such as vacuum deposition, sputtering, a CVD process, a MOCVD process or the like to form the layer. The composition of the metal fluoride wherein the contents of the metal of the group II and the fluorine atom are deviated from the stoichiometric composition as stated hereinbefore can be arbitrarily controlled by appropriately controlling the substrate temperature, the film-forming atmospheric gas composition or conditions and the like. For instance, if $CF_4$ is introduced into the film-forming atmosphere, it becomes possible to increase the content of F in the light emission layer.

The light emission layer should preferably be formed in a thickness of from about 7000 angstroms.

The inorganic thin film EL device may have a layer structure that is ordinarily used for this purpose.

Reference is now made to the accompanying drawings in which typical EL devices are shown. In the drawings, like reference numerals indicate like parts or members. FIG. 1 shows an inorganic thin film EL device $D_1$ which includes an insulating substrate 1, and a back electrode 2, an insulating layer 3, a light emission layer 4, an optically transparent insulating layer 3 and an optically transparent electrode 5 formed on the substrate 1 in this order. In this arrangement, the light emitted from the light emission layer 4 is taken out from the side of the optically transparent electrode 5.

Figure 2:
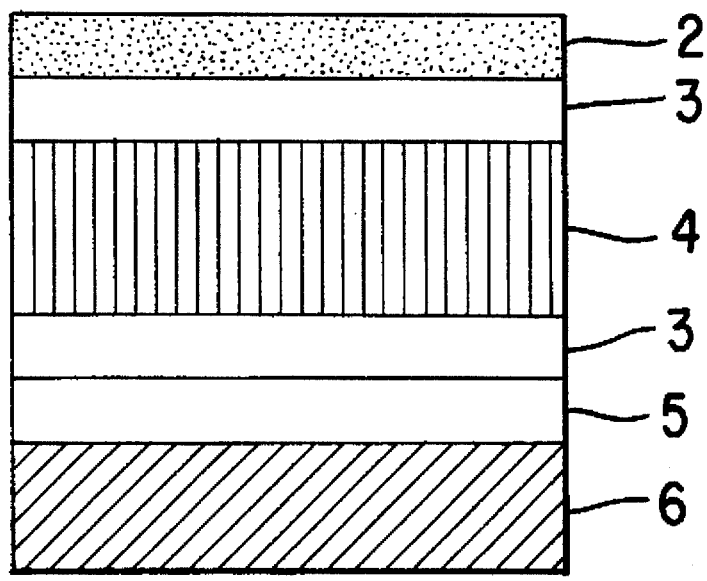
FIG. 2 is a schematic sectional view of an inorganic thin film EL device according to another embodiment of the invention.

FIG. 2 shows another embodiment which includes an optically transparent substrate 6, and an optically transparent electrode 5, an optically transparent insulating layer 3, a light emission layer 4, an insulating layer 3 and a back electrode 5 formed on the substrate 6 in this order as shown. In this case, the light from the layer 4 is taken out from the side of the transparent substrate 6.

As a matter of course, the EL device of the invention is not limited to these arrangements set out above provided that the light emission layer made of a specific type of composition set forth hereinbefore is used. For instance, a semiconductor layer may be provided between the light emission layer 4 and the insulating layer 3 at opposite sides of the layer 4. The semiconductor layer serves as an injection layer of carriers by which the resultant device is further improved in luminance.

The insulating substrate may be made of any known material ordinarily used for this purpose and such materials include, for example, glass, and the like. For the optically transparent substrate, glass may be used.

The insulating layers 3, 3 may be made of $ZnF_2$, $CaF_2$, $MgF_2$, $SiN_x$, $TaO_x$, $Al_2O_3$, $Y_2O_3$, $PbTiO_3$ and the like. If transparency is necessary, $CaF_2$ and the like material may be used. The respective insulating layers 3, 3 may have a double-layer structure of these materials.

The electrode 2 may be made of metals such as aluminium. The transparent electrode 5 may be made, for example, of indium tin oxide (ITO).

The semiconductor layer which serves as the injection layer as set forth above may be made of hydrogenated amorphous silicon, I–VII compound semiconductors such as CaS, MgS and the like, II–VI compound semiconductors such as $HgI_2$, III–V compound semiconductors such as AlAs, GaN and the like, IV–VI compound semiconductors such as $TiO_2$, $SnO_2$ and the like, V–VI compound semiconductors such as $As_2O_3$, $Bi_2O_3$ and the like, and organic semiconductors such as polyvinyl carbazole and the like.

The formation of these layers is well known in the art and is not described herein.

The inorganic thin film EL devices of the invention have a high carrier concentration, so that DC or low frequency AC drive potential may be used. Preferably, a DC potential is preferred in view of the ease in the design of circuit.

The light emission layer of the EL device of the invention which is made of an inorganic fluorescer is able to emit an electroluminescence with a high intensity. The electroluminescence is changed in color depending on the type of a rare earth element to be added. For instance, when gadolinium is added, purple light is emitted. The addition of praseodymium results in the emission of blue light, and the addition of terbium results in green light. Similarly, the addition of europium results in the emission of orange light. Accordingly, different light colors can be obtained depending on the type of rare earth element or rare earth element compound, thus ensuring full coloration.

The invention is more particularly described by way of examples, which should not be construed as limiting the invention thereto.

EXAMPLE 1

10 wt % of gadolinium fluoride was mixed with 89 wt % of zinc fluoride, to which Au was added as a co-activator, followed by press molding at 800 kg/cm² to obtain a pellet for use in vacuum evaporation. This pellet was used to make an inorganic thin film EL device having such a layer arrangement as shown in FIG. 1.

An Al electrode 2 formed on an insulating substrate 1 was provided, on which $Ta_2O_5$ was vacuum deposited by means of an electron beam to form a 2000 angstrom thick insulating layer 3. Thereafter, the pellet obtained above was subjected to vacuum deposition using an electron beam to form a 7000 angstrom inorganic fluorescent, light emission layer 4. When the layer 4 was formed at a substrate temperature of 200° C. in a $CF_4$ gas and subjected to SEMEPMA measurement, it was found that the atomic ratio of Zn and F was 0.8:2.3. The layer 4 was also subjected to measurement of electric conductivity, whereupon it was found that the conductivity was higher by one order of magnitude than that of a layer which was formed in a $CF_4$ gas-free atmosphere.

$Ta_2O_5$ was then vacuum deposited by use of an electron beam to form a 2000 angstrom thick insulating layer 3 on the layer 4. Finally, an optically transparent electrode film 5 made of ITO was vacuum deposited on the insulating layer 3 in a thickness of 1000 angstroms.

The resultant inorganic thin film EL device was subjected to measurement of a light emission characteristic, revealing that UV light was emitted as having a peak in the vicinity of 312 nm and an intensity of 0.01 $mW/cm^2$.

EXAMPLE 2

10 wt % of erbium fluoride was mixed with 90 wt % of cadmium fluoride, followed by press molding at 800 $kg/cm^2$ to obtain a pellet for use in vacuum evaporation. This pellet was used to make an inorganic thin film EL device having such a layer arrangement as shown in FIG. 2.

An optically transparent electrode 5 made of ITO and formed on an optically transparent glass substrate 6 was provided, on which $CaF_2$ was vacuum deposited by means of an electron beam to form a 2000 angstrom thick insulating layer 3. Thereafter, the pellet obtained above was subjected to vacuum deposition using an electron beam at a substrate temperature of 200° C. in a $CF_4$ gas to form a 7000 angstrom thick inorganic fluorescent, light emission layer 4. The SEMEPMA measurement of the layer 4 revealed that the light emission layer had an atomic ratio of Cd and F of 0.9:2.2. The layer 4 was also subjected to measurement of electric conductivity, whereupon it was found that the conductivity was higher by one order of magnitude than that of a layer which was formed in a $CF_4$ gas-free atmosphere.

$CaF_2$ was then vacuum deposited by use of an electron beam to form a 2000 angstrom thick insulating layer 3 on the layer 4. Finally, a back electrode 2 made of Al was vacuum deposited in a thickness of 1000 angstroms.

The resultant inorganic thin film EL device was subjected to measurement of a light emission characteristic, revealing that green light was emitted as having an intensity of 0.01 $mW/cm^2$.

EXAMPLE 3

10 wt % of gadolinium fluoride was mixed with 89 wt % of zinc fluoride, to which Au was added as a co-activator, followed by press molding at 800 $kg/cm^2$ to obtain a pellet for use in vacuum evaporation. This pellet was used to make an inorganic thin film EL device having such a layer arrangement as shown in FIG. 1.

An Al electrode 2 formed on an insulating substrate 1 was provided, on which $Ta_2O_5$ was vacuum deposited by means of an electron beam to form a 2000 angstrom thick insulating layer 3. Thereafter, the pellet obtained above was subjected to vacuum deposition using an electron beam at a substrate temperature of 120° C. to form a 7000 angstrom inorganic fluorescent, light emission layer 4. The SEMEPMA measurement revealed that the layer had an atomic ratio of Zn and F of 1.2:1.8. The layer 4 was also subjected to measurement of electric conductivity, whereupon it was found that the conductivity was higher by two orders of magnitude than that of a layer having Zn:F=1:2 which was formed at a substrate temperature of 200° C.

$Ta_2O_5$ was then vacuum deposited by use of an electron beam to form a 2000 angstrom thick insulating layer 3 on the layer 4. Finally, an optically transparent electrode film 5 made of ITO was vacuum deposited on the insulating layer 3 in a thickness of 1000 angstroms.

The resultant inorganic thin film EL device was subjected to measurement of a light emission characteristic, revealing that UV light was emitted as having a peak in the vicinity of 312 nm and an intensity of 0.01 $mW/cm^2$.

EXAMPLE 4

10 wt % of erbium fluoride was mixed with 90 wt % of cadmium fluoride, followed by press molding at 800 $kg/cm^2$ to obtain a pellet for use in vacuum evaporation. This pellet was used to make an inorganic thin film EL device having such a layer arrangement as shown in FIG. 2.

An optically transparent electrode 5 made of ITO and formed on an optically transparent glass substrate 6 was provided, on which $CaF_2$ was vacuum deposited by means of an electron beam to form a 2000 angstrom thick insulating layer 3. Thereafter, the pellet obtained above was subjected to vacuum deposition using an electron beam at a substrate temperature of 150° C. to form a 7000 angstrom thick inorganic fluorescent, light emission layer 4. The SEMEPMA measurement of the layer 4 revealed that the light emission layer had an atomic ratio of Cd and F of 1.5:1.3. The layer 4 was also subjected to measurement of electric conductivity, whereupon it was found that the conductivity was higher by one order of magnitude than that of a layer with Zn:F=1:2 which was formed at a substrate temperature of 200° C.

$CaF_2$ was then vacuum deposited by use of an electron beam to form a 2000 angstrom thick insulating layer 3 on the layer 4. Finally, a back electrode 2 made of Al was vacuum deposited in a thickness of 1000 angstroms.

The resultant inorganic thin film EL device was subjected to measurement of a light emission characteristic, revealing that green light was emitted as having an intensity of 0.01 $mW/cm^2$.

As will be apparent from the above examples, the atomic ratio of the metal fluoride can be arbitrarily changed by controlling the substrate temperature or by addition of a specific type of gas. The EL devices of the invention have a higher luminance and a longer life, and can cover a wider range of wavelengths of emission light than known counterparts. Thus, the EL devices of the invention are very useful as a flat light source such as a display.

What is claimed is:

1. An inorganic thin film EL device which comprises a substrate, a light emission layer sandwiched between paired insulating layers, said insulating layers sandwiched between a pair of electrode layers, said substrate approximating one layer of the pair of electrode layers and arranged such that light emitted from the light emission layer is taken out from one side of the light emission layer, the light emission layer being made of composition having a formula $M_{1-x}F_{2+y}$:RE, wherein M represents a metal of group II of the Periodic Table, x is a value ranging from 0.001 to 0.0, F represents fluoride, y is a value ranging from 0.001 to 1.8 and RE represents a rare earth element.

2. An inorganic thin film EL device according to claim 1, wherein said metal of group II is at least one member selected from the group consisting of cadmium, zinc, strontium, calcium, barium and beryllium.

3. An inorganic thin film EL device according to claim 1, wherein x is a value ranging from 0.2 to 0.6 and y is a value ranging from 0.4 to 1.2.

4. An inorganic thin film EL device according to claim 1, wherein said near earth element is added in an amount of from 0.01 to 30 wt %, calculated as the element, based on the total of said metal fluoride and said member.

5. An inorganic thin film EL device according to claim 1, wherein said rare earth element is at least one member selected from the group consisting of cerium, praseodymium, neodymium, samarium, europium, gadolinium, terbium, dysprosium, holmium, erbium, thulium and ytterbium.

6. An inorganic thin film EL device according to claim 1, further comprising a semiconductor layer between one of the paired insulating layer and said light emission layer at opposite sides of said light emission layer.

7. An inorganic thin film EL device according to claim 1, wherein said substrate, and one of the paired electrodes and one of the paired insulating layers formed directly on said substrate in this order are all optically transparent whereby light emitted from said light emission layer is taken out therethrough.

8. An inorganic thin film EL device according to claim 1, wherein one of the paired insulating layers and one of the paired electrodes which are formed on said light emission layer in this order are optically transparent whereby light emitted from said light emission layer is taken out therethrough.

9. An inorganic thin film EL device which comprises a substrate, a light emission layer sandwiched between paired insulating layers, said insulating layers sandwiched between a pair of electrode layers, said substrate approximating one layer of the pair of electrode layers and arranged such that light emitted from the light emission layer is taken out from one side of the light emission layer, the light emission layer being made of composition having a formula $M_{1+x}F_{2-y}$:RE, wherein M represents a metal of group II of the Periodic Table, x is a value ranging from 0.001 to 0.0, F represents fluoride, y is a value ranging from 0.001 to 1.8 and RE represents a rare earth element.

10. An inorganic thin film EL device according to claim 9, wherein said metal of group II is at least one member selected from the group consisting of cadmium, zinc, strontium, calcium, barium and beryllium.

11. An inorganic thin film EL device according to claim 9, wherein x is a value ranging from 0.2 to 0.6 and y is a value ranging from 0.4 to 1.2.

12. An inorganic thin film EL device according to claim 9, wherein said near earth element is added in an amount of from 8.01 to 30 wt %, calculated as the element, based on the total of said metal fluoride and said near earth element.

13. An inorganic thin film EL device according to claim 9, wherein said rare earth element is at least one member selected from the group consisting of cerium, praseodymium, neodymium, samarium, europium, gadolinium, terbium, dysprosium, holmium, erbium, thulium and ytterbium.

14. An inorganic thin film EL device according to claim 9, further comprising a semiconductor layer between one of the paired insulating layer and said light emission layer at opposite sides of said light emission layer.

15. An inorganic thin film EL device according to claim 9, wherein said substrate, and one of the paired electrodes and one of the paired insulating layers formed directly on said substrate in this order are all optically transparent whereby light emitted from said light emission layer is taken out therethrough.

16. An inorganic thin film EL device according to claim 9, wherein one of the paired insulating layers and one of the paired electrodes which are formed on said light emission layer in this order are optically transparent whereby light emitted from said light emission layer is taken out therethrough.

* * * * *